(12) United States Patent
Ueda et al.

(10) Patent No.: US 6,682,770 B2
(45) Date of Patent: Jan. 27, 2004

(54) POLYSACCHARIDE CAPABLE OF REDUCING THE VISCOSITY OF A HYDRATED PSYLLIUM, AND FOODS CONTAINING THE POLYSACCHARIDE AND PSYLLIUM

(75) Inventors: Kazuhiko Ueda, Osaka (JP); Daizaburo Akiyama, Osaka (JP); Katsuhiro Date, Osaka (JP); Takuo Nakazeko, Osaka (JP); Yasumasa Kawamura, Osaka (JP)

(73) Assignee: Nissin Shokuhin Kabushiki Kaisha, Osaka (JP)

( * ) Notice: Subject to any disclaimer, the term of this patent is extended or adjusted under 35 U.S.C. 154(b) by 115 days.

(21) Appl. No.: 09/861,335

(22) Filed: May 18, 2001

(65) Prior Publication Data

US 2001/0051203 A1 Dec. 13, 2001

Related U.S. Application Data

(62) Division of application No. 09/457,168, filed on Dec. 8, 1999, now abandoned.

(30) Foreign Application Priority Data

Dec. 10, 1998 (JP) ........................................... 10-351363
Feb. 3, 1999 (JP) ........................................... 11-026293
Oct. 5, 1999 (JP) ........................................... 11-284427

(51) Int. Cl.[7] ........................ A23L 1/0522; A23L 1/052
(52) U.S. Cl. .................................................... 426/661
(58) Field of Search ................................. 426/589, 599, 426/661, 615, 71, 285, 648, 578, 407, 392; 127/32, 33, 71

(56) References Cited

U.S. PATENT DOCUMENTS

| 4,089,981 | A | * | 5/1978 | Richardson | ................. | 426/104 |
| 4,548,806 | A | * | 10/1985 | Colliopoulos et al. | ....... | 424/440 |
| 5,009,916 | A | * | 4/1991 | Colliopoulos | ................ | 424/738 |
| 5,073,370 | A | * | 12/1991 | Meer et al. | .................. | 424/738 |
| 5,232,699 | A | * | 8/1993 | Colliopoulos | ............... | 424/727 |
| 5,306,327 | A | * | 4/1994 | Dingeman et al. | ............. | 75/303 |
| 5,338,549 | A | | 8/1994 | Hord et al. | .................. | 424/439 |
| 5,523,014 | A | | 6/1996 | Dolan et al. | ................. | 252/122 |
| 5,895,804 | A | | 4/1999 | Lee et al. | ................... | 525/54.3 |
| 6,312,730 | B1 | * | 11/2001 | Sander | ........................ | 424/489 |

FOREIGN PATENT DOCUMENTS

| GB | 890207 | 3/1958 | |
| JP | 04 3633011 | 12/1992 | |
| JP | 05015340 | 1/1993 | ............ A23L/1/308 |
| JP | 09272702 | 10/1997 | ............ C08B/30/00 |
| JP | 10-745558 | * 6/1998 | |
| WO | WO 93/17588 | 9/1993 | .............. A23L/2/38 |

OTHER PUBLICATIONS

O. Fennema, *Food Chemistry*, 3rd Edition, Marcel Dekker Inc., pp. 201–204 (1996).

* cited by examiner

Primary Examiner—Keith Hendricks
(74) Attorney, Agent, or Firm—Marshall, Gerstein & Borun LLP

(57) ABSTRACT

A polysaccharide useful as an ingredient of a food containing psyllium is disclosed. The increase of viscosity resulting from hydrated psyllium can be reduced by the present polysaccharides without adversely affecting the physiologically beneficial effects of psyllium. The present invention also provides a food product containing the psyllium viscosity-reducing polysaccharide and psyllium, and a method of manufacturing the same, characterized by having excellent handling properties and favorable palatability, even if the method includes a step of heating the psyllium, especially in a hydrated form.

3 Claims, 5 Drawing Sheets

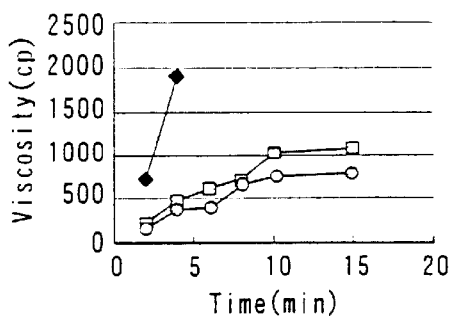
Fig.3A Sample No.1
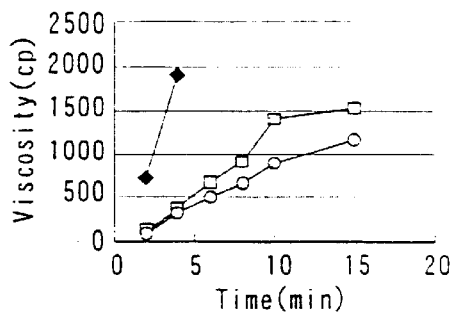
Fig.3B Sample No.2
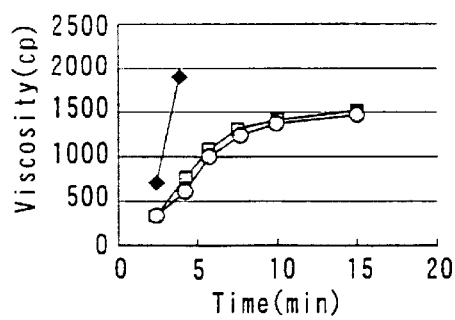
Fig.3C Sample No.3
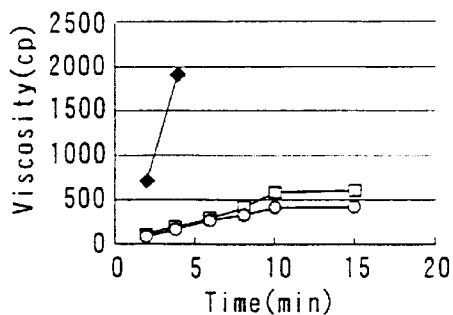
Fig.3D Sample No.4
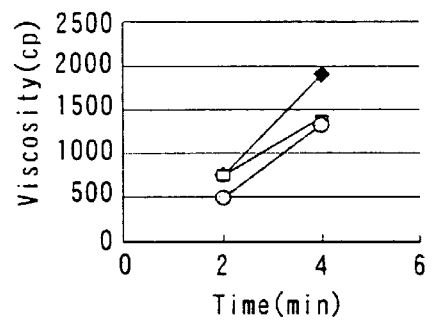
Fig.3E Sample No.5
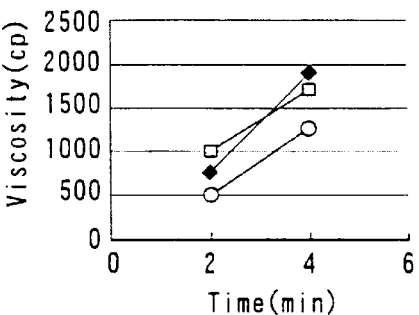
Fig.3F Sample No.6
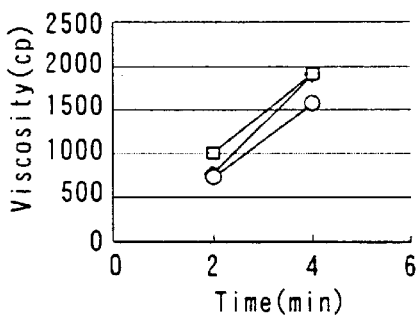
Fig.3G Sample No.7

POLYSACCHARIDE CAPABLE OF REDUCING THE VISCOSITY OF A HYDRATED PSYLLIUM, AND FOODS CONTAINING THE POLYSACCHARIDE AND PSYLLIUM

CROSS-REFERENCE TO RELATED APPLICATION

This application is a divisional of application Ser. No. 09/457,168, filed Dec. 8, 1999, now abandoned.

FIELD OF THE INVENTION

The present invention relates to a polysaccharide which is useful as an ingredient in a variety of foods containing psyllium, which is known to generate a high viscosity when hydrated. In accordance with the present invention, a polysaccharide which can reduce viscosity resulting from hydrated psyllium is provided. In addition, a food additive composition containing the polysaccharide and psyllium is provided. The food additive can be readily incorporated into foods without a loss of beneficial effects of psyllium and without an undesirable increase in the viscosity of the foods. Further, the present invention also provides a food product characterized by its ingredients, which are the psyllium viscosity-reducing polysaccharide and psyllium, and by its excellent handling properties and favorable palatability, and a method of manufacturing the same.

BACKGROUND OF THE INVENTION

A recent trend of western-style dietary habits in Japan resulted in a continuous reduction in the consumption of dietary fibers. The current daily intake of dietary fibers is as low as about 17 g, which is far lower than the target level of 20 to 25 g prescribed by Ministry of Health and Welfare in Japan. In response to physiological studies directed to the actions of dietary fibers in a human body, the importance of dietary fiber in health care and disease control has been well recognized. Accordingly, various attempts are made to incorporate a dietary fiber into various foods for the purpose of increasing the intake of dietary fibers, which otherwise tends to be deficient.

We focused on psyllium, among dietary fibers, which was reported to have excellent water-retaining capability and swelling ability, as well as various physiological effects such as an intestinal function-controlling effect, blood lipid-controlling effect, hyperglycemia-suppressing effect, and blood cholesterol-reducing effect. Also, psyllium is barely digested and contains few calories, but provides a sense of satiety, and thereby is expected to exact a weight-controlling effect.

Psyllium is a naturally occurring vegetable gum derived from a seed of a plant of Plantago species, such as *Plantago Ovata Forskal,* which is a kind of plantain cultivated in Rajasthan and Gujarat states in India. Psyllium forms a highly viscous dispersion when hydrated, and it can form a dispersion having the viscosity as high as about 4000 cp (centipoise, determined using a type B viscometer with Rotor No. 3, at 30 rpm and 25° C.) for example, even when added at a concentration as low as 1% by weight. When hydrated at 2% by weight, psyllium usually forms a gelatin-like clear gel. When a 1% dispersion is heated to 90° C. and then cooled, a hard gel mass can be formed. The viscosity, which is as described above, is several or several ten times greater when compared with other thickening polysaccharides, such as guar gum, locust bean gum, and tara gum, added at the same concentration. In addition, although these thickening polysaccharides exhibit fluidity, even at a high viscosity, psyllium exhibits both high viscosity and high gelling ability.

Accordingly, when psyllium is incorporated into food products, such as beverages, confectioneries, breads, and noodles, in an attempt to obtain physiological effects, such as the intestine function-controlling effect as described above, the psyllium can be swollen during the manufacturing process later than the step of mixing with water due to the physical characteristics described above, thereby resulting in high viscosity. As a result, problems such as difficulties in processing and adverse effects on palatability are experienced, and applications in the field of food processing have been hampered. Therefore, a technique to suppress the onset of the elevated viscosity and gel-forming characteristics in response to the hydration of psyllium is still desired for the purpose of providing an improved handling of psyllium that is to be incorporated into various food products.

Especially, when manufacturing a liquid food to be packed into a sealed container is intended, the manufacturing process requires a step of heat sterilization following the hydration step of psyllium. Therefore, several problems result, such as formation of a hard gel, leading to impossibilities in packing into a container and to difficulties in retaining favorable fluidity or palatability.

A conventional method for suppressing the onset of the elevated viscosity resulting psyllium is disclosed in Japanese Patent Application Laid-Open No. 5-15340, which discloses a method of processing a dietary fiber psyllium in which an agar solution prepared by heating for dissolution is supplemented with psyllium powder, and then solidified by cooling. In this method, although psyllium is fused by means of the coagulating action of agar, thereby achieving a decrease in viscosity, the coagulated psyllium and agar should be used together, preferably as a pulverized solid, and thus a reduction in the gelling ability of the psyllium alone in a hydration system is not achieved. In addition, because the usable form is a pulverized solid including agar, the scope of the applicable food products is necessarily limited.

SUMMARY OF THE INVENTION

An object of the present invention is to provide a psyllium viscosity-reducing polysaccharide capable of suppressing the onset of an elevated viscosity and gel-forming characteristics (hereinafter referred to simply as "viscosity") resulting from the hydration of psyllium, without deteriorating the physiological effects naturally associated with the psyllium, such as an intestinal function-controlling effect and the like.

Several attempts were made to achieve the object described above, and it was discovered, unexpectedly, that when a certain polysaccharide, such as a specified starch, is present in a hydration system for psyllium, the onset of elevated viscosity in a psyllium hydrate can be suppressed significantly. A further effort was made to finally identify such polysaccharides, thereby establishing the present invention.

Thus, an aspect of the present invention is to provide a polysaccharide for reducing the viscosity resulting from psyllium (i.e., "a psyllium viscosity-reducing polysaccharide") having a molecular weight of 20,000 or greater and viscosity of an aqueous solution at 2% by weight of 9.0 cp or less (determined using a type B viscometer with Rotor No. 1, at 60 rpm and 25° C.). A polysaccharide having these characteristics can reduce the viscosity in a psyllium hydrate system without deteriorating any useful physiological property possessed naturally by psyllium, and without interfering in the manufacturing process or causing any adverse effect on palatability when incorporated into a water containing food.

The psyllium viscosity-reducing polysaccharide according to the present invention preferably is granulated to impart a desirable psyllium viscosity-reducing ability. Such polysaccharides can efficiently prolong the onset of an elevated viscosity upon hydration of psyllium, thus it is advantageously used for the manufacture of a powdered food for preparing a liquid food, such as powdered juice mix or powdered instant soup mix, namely food products which are prepared by dissolving in water, or in hot or boiling water, prior to drinking/eating them. It is preferable that the polysaccharide is granulated to yield 70% by weight or more of the particles being unable to pass through the 140 mesh sieve (140 mesh on), thereby the desirable psyllium viscosity-reducing effect, handling feasibility and solubility of the food product, as well as a preferred dispersion property and bulk density, can be achieved.

In a first aspect of the present invention as above-described, the psyllium viscosity-reducing polysaccharide preferably can be one selected from the group consisting of a modified starch, gum arabic, arabinogalactan, partially decomposed guar gum, pullulan, a dietary fiber, and mixtures thereof, due to the excellent psyllium viscosity-reducing ability thereof.

In particular, the modification method to obtain a modified starch can be, for example, one or more of oxidation, etherification, esterification, and gelatinization.

The polysaccharide particularly preferred in the present invention is selected from the group consisting of oxidized tapioca starch, oxidized potato starch, acid-treated gelatinized potato starch, waxy cornstarch octenyl succinate, acid-treated hydroxypropyl etherified tapioca starch, and mixtures thereof.

Another aspect of the invention is to provide a food additive composition containing psyllium, and the psyllium viscosity-reducing polysaccharide. Since this food additive composition contains psyllium together with the polysaccharide described above, it readily can be incorporated into a food product, especially into a liquid food manufactured in a water-based system, or a food whose manufacturing process involves heating in a hydrated condition. Because the psyllium thus incorporated retains its beneficial physiological effect, the psyllium provides a desirable effect to a consumer of the food comprising the composition.

The invention also provides a food product characterized by its ingredients, namely psyllium and the psyllium viscosity-reducing polysaccharide. Such a food product preferably can be a food whose starting material itself contains water, a food prepared by adding water during its manufacturing process, or a food intended to be prepared or cooked by adding water just before eating, such as noodles, confectioneries, cereals, iced confectioneries, breads, chilled confectioneries, soups, processed sea foods, processed meats, beverages, and dairy foods.

Moreover, another object of the present invention is to provide a liquid food comprising psyllium and the polysaccharide for reducing the viscosity resulting from the psyllium, wherein the polysaccharide has a molecular weight of 20,000 or greater and viscosity of an aqueous solution at 2% by weight of 9.0 cp or less (determined using a type B viscometer with Rotor No. 1, at 60 rpm and 25° C.), and is selected from a group of modified starches consisting of etherified starch, esterified starch, and any mixture thereof.

In this aspect of the invention, the onset of an elevated viscosity/gel formation in a psyllium hydrate can be suppressed and a reduction in the viscosity/gelling ability can be achieved, even if the method includes a step of heating, and the physiological effects associated naturally with psyllium, such as an intestinal function-controlling effect, may not be deteriorated. A prominent suppressive effect on the onset of the elevated viscosity/gel formation in a psyllium hydrate can be achieved using the specified polysaccharide as described above (molecular weight: 20,000 or greater; and the viscosity of an aqueous solution at 2% by weight: 9.0 cp or less (determined using a type B viscometer with Rotor No. 1, at 60 rpm and 25° C.). However, some of the candidate polysaccharides may not be practical because additional problems arise when the hydration system comprising the polysaccharide and psyllium is heated. Namely, when the hydration system containing such polysaccharide having low viscosity was heated for the purpose of sterilization, gel formation was initiated, then the gel body was separated from the aqueous phase. The gel developed in such a manner cannot be easily broken for dispersion in a homogenous liquid, even if it was thoroughly crushed using a food mill or the like.

The modified starch preferably is selected from the group consisting of acid-treated hydroxypropyl etherified tapioca starch, waxy cornstarch octenyl succinate, and a mixture thereof, which exert desirable effects to suppress the onset of the viscosity/gel formation. In addition, they can suppress the remarkable onset of an elevated viscosity resulting from psyllium upon heating, and can significantly reduce gel strength.

As another aspect of the invention, a method for manufacturing a liquid food is provided, comprising the steps of: (a) preparing an aqueous solution comprising psyllium and at least one modified starch selected from the group consisting of etherified starch, esterified starch, and a mixture thereof, said modified starch having a molecular weight of 20,000 or greater and a viscosity of an aqueous solution at 2% by weight of 9.0 cp or less (determined using a type B viscometer with Rotor No. 1 at 60 rpm and 25° C.); (b) packing the solution into a container followed by sealing; and (c) sterilizing the solution by heating any time before, during, or after step (b) is conducted. In this method of manufacturing a liquid food, psyllium preferably can be added after dissolution of the modified starch during the step (a), thereby more efficiently preventing the onset of elevated viscosity/gel formation upon the addition, followed by heating, of the psyllium is accomplished. Moreover, it is preferable in this method to select the modified starch from the group consisting of acid-treated hydroxypropyl etherified tapioca starch, waxy cornstarch octenyl succinate, and a mixture thereof, because a liquid food comprising psyllium can be provided, which has a lower viscosity and gel strength while the physiologically beneficial effects associated naturally with psyllium, such as intestinal function-controlling effect, can be preserved, even if heat sterilization is conducted after preparing the solution which contains psyllium. Thus, in accordance with this aspect of the invention, manufacturing a liquid food which comprises psyllium is enabled, wherein facility in handling and palatability in consumption are both excellent.

Furthermore, another aspect of the present invention is to provide a powdered food for preparing a liquid food comprising psyllium and a psyllium viscosity-reducing polysaccharide, wherein the polysaccharide is granulated, while having a molecular weight of 20,000 or greater and the viscosity of an aqueous solution at 2% by weight of 9.0 cp or less (determined using a type B viscometer with Rotor No. 1, at 60 rpm and 25° C.). Because a polysaccharide having such characteristics can exert an efficient psyllium viscosity-reducing effect, it can be added readily to psyllium-containing food products, such as a powdered food for preparing a liquid food (e.g., powdered juice mix or powdered instant soup mix), which are prepared in a water containing system, and the food products which comprise water, such as jelly or liquid beverage, while the physiologically advantageous effects of the psyllium are preserved after preparing the food products. Thus, beneficial effects are imparted to the consumers of these food products.

BRIEF DESCRIPTION OF THE DRAWINGS

FIGS. 3a–3g illustrate graphs showing time dependent alteration of the viscosity of an aqueous solution comprising the psyllium composition containing each of the polysaccharides shown in FIGS. 1 and 2, or an aqueous solution of psyllium.

DETAILED DESCRIPTION OF THE PREFERRED EMBODIMENTS

Figure 1:
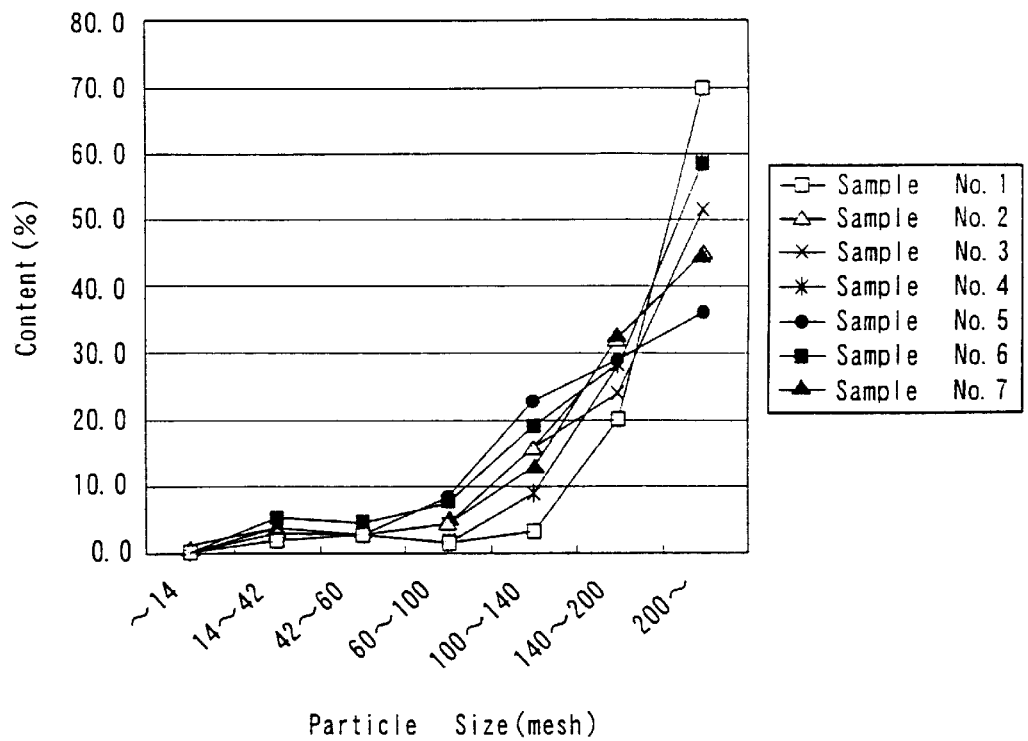
FIG. 1 illustrates a graph showing the particle size distribution of the ungranulated polysaccharides.

Embodiments of the present invention are described below.

A psyllium in the invention can be a polysaccharide derived from the hull of a seed of *Plantago ovata*, which is a plant of Plantago species, and includes commercially available psyllium and psyllium seed gum. Such psyllium is not particularly limited in respect to its purification method or particle size.

The term "viscosity-reducing" means any alteration to impart both a lower viscosity and gel strength than those naturally possessed by a psyllium hydrate.

1. Characterization of Psyllium Viscosity-Reducing Polysaccharide

As described above, a viscosity-reducing polysaccharide according to the invention has a molecular weight of 20,000 or greater, and a viscosity of an aqueous solution at 2% by weight of 9.0 cp or less, when determined using a type B viscometer with Rotor No. 1 at 60 rpm and 25° C. Two or more polysaccharides having these characteristics can be used in combination. The molecular weight herein is calculated based on the calibration curve obtained by a gel filtration chromatography with a standard substance on a gel filtration column (for example, TSKgel TOYOPEARL manufactured by TOSO).

The source of a polysaccharide according to the invention is not be particularly limited, and includes, in addition to the modified starch described below, gum arabic, arabinogalactan, dietary fibers such as those derived from soybean, pullulan, and mixtures thereof (see Example 2).

The sources of the modified starch can include for example, tapioca starch, potato starch, cornstarch, rice starch, wheat starch, and the like.

The method for modification of the starch to obtain a modified starch may be one of the following:
(1) Oxidation using sodium hypochlorite or equivalent reagents;
(2) Etherification, such as hydroxypropyl etherification and carboxymethyl etherification;
(3) Derivatization into esters, such as acetates, octenyl succinates and phosphates; and,
(4) Gelatinization, as well as a combination of two or more of these methods.

Among the modified starches produced as above, those preferred, particularly due to their excellent psyllium viscosity-reducing effect, include oxidized tapioca starch, oxidized potato starch, acid-treated gelatinized potato starch, waxy cornstarch octenyl succinate, and acid-treated hydroxypropyl etherified tapioca starch (see Example 1). Among these modified starches, acid-treated hydroxypropyl etherified tapioca starch is especially preferred because of its heat resistant property. Accordingly, this starch can be useful in preparing a food product because it retains a striking psyllium viscosity-reducing effect even after a high temperature treatment, such as heat sterilization, is carried out (see Example 5).

It is a matter of course that the physiological activity possessed naturally by psyllium should be preserved even after the viscosity is reduced by the addition of the polysaccharide mentioned above, and it was demonstrated by determining the water-retaining capacity in biological digestion model in vitro that about 70% or higher of the original water-retaining capacity was preserved following the reduction of the viscosity according to the present invention (see Example 6).

Further, for the purpose of manufacturing the liquid food, the modified starch preferably is selected from the group consisting of acid-treated hydroxypropyl etherified tapioca starch, waxy cornstarch octenyl succinate, and a mixture thereof. These modified starches can provide a liquid food comprising psyllium which has a lower viscosity and gel strength, while the physiological effects associated naturally with psyllium, such as an intestinal function-controlling effect, are preserved even if heat sterilization is conducted after preparing a solution which contains psyllium. In addition to the modified starch described above, dextrin of which DE (Dextrose Equivalent) is 16 or lower preferably can be added because further improvement of the palatability of the liquid food can be achieved.

2. Polysaccharide Content

The amount of polysaccharide added relative to the amount of psyllium can vary depending upon the concentration of the psyllium and the viscosity of the polysaccharide itself. Thus, the psyllium viscosity-reducing effect of the polysaccharide according to the invention can be increased corresponding to the increase in the amount added, to a certain extent of the concentration (amount added) which can vary depending on the source and the modification of the polysaccharide employed. Nevertheless, the polysaccharide should be added in an amount which does not result in the excess viscosity over the value achieved as a result of the viscosity-reducing effect of the polysaccharide added, since the polysaccharide itself can exhibit some extent of viscosity.

For example, as shown in Example 3 described infra, when acid-treated hydroxypropyl etherified tapioca starch was used as the psyllium viscosity-reducing polysaccharide and added to a 1% or 2% by weight aqueous solution of psyllium, the reduction in the viscosity of the psyllium was observed in the concentration range of 20% to 30% by weight of the polysaccharide. When each of gum arabic and arabinogalactan was added to a 2% by weight aqueous solution of psyllium, the reduction in the viscosity of the psyllium was observed at a concentration up to 2% and 3% by weight, respectively.

3. Preparation of Hydration System of the Polysaccharide and Psyllium

A significant reduction in the viscosity in a hydration system of psyllium can be achieved with the polysaccharide according to the invention as discussed above. Such hydration system means a system in which the polysaccharide and psyllium coexist in an aqueous substance as a solution or as a dispersion, and in which any other additional food materials optionally can be included. A method of producing such a hydration system is not particularly limited, and may be for example:

(1) a method in which psyllium is added to an aqueous material containing the polysaccharide;

(2) a method in which a particulate mixture of the polysaccharide and psyllium is added to an aqueous material and then dissolved;

(3) a method in which an aqueous material containing the polysaccharide is admixed with an aqueous material containing psyllium;

(4) a method in which psyllium containing fluid is admixed with the polysaccharide and dissolved, and the like (also see Example 4).

In order to obtain a solution of a water insoluble polysaccharide among those listed above, dissolution can be effected by heating, otherwise, previous gelatinization can be carried out to impart a desirable water solubility.

When the modified starch is dissolved by heating, it is preferable to add psyllium after solubilization of the modified starch so that the onset of viscosity/gel formation upon heating of psyllium can be avoided more efficiently.

4. Application to Food Additive Composition

As a form of a food additive composition containing the viscosity-reducing polysaccharide and psyllium, a particulate mixture of the polysaccharide and psyllium, or a hydrate of the both components formed by the method described above in Section 3 can be employed, and the ratio of each added component can be appropriately determined within a range allowing the polysaccharide to exert its psyllium viscosity-reducing effect.

Using a certain polysaccharide (e.g., acid-treated hydroxypropyl etherified tapioca starch), the food additive composition described above enables prevention of thickening/gelling by psyllium associated with a heat treatment.

5. Application to Processed Food

Since the polysaccharide according to the invention reduces the thickening/gelling ability of psyllium significantly when its effect is exerted in the hydration system including psyllium, it enables the use of psyllium particularly in a food for which the use thereof has been difficult because of its potent thickening/gelling behavior, such as a water-containing food or a food for which water should be added during its preparation process. Such foods, for example, can be noodles, confectioneries, breads, cereals, chilled confectioneries, iced confectioneries, soups, processed seafoods, processed meats, beverages, and dairy foods.

6. Application to Liquid Food

If psyllium is incorporated in a higher amount into the food product, the amount of the viscosity-reducing polysaccharide is increased in order to attain the desirable viscosity-reducing ability. The suitable amount of psyllium in the liquid food can be 5% by weight or less preferably, based on the handling feasibility, fluidity, and palatability of the product. The temperature of the solution/dispersion of the viscosity-reducing polysaccharide to which psyllium is added can be of any range, however, it preferably is between 30–80° C. in view of handling feasibility.

As further ingredients of the food product of the invention, the following additional food materials optionally can be added when manufacturing a liquid food is intended: sweeteners, such as sugar, fructose and glucose; flavoring materials, such as fruit juice (e.g., grape juice, apple juice), acidulants (e.g., ascorbic acid, tartaric acid, sodium citrate); and nutritional materials, such as vitamins, polyphenols, oligosaccharides, minerals, and the like.

When the method of manufacturing the liquid food comprises the steps of: (a) preparing an aqueous solution comprising psyllium and at least one modified starch selected from the group consisting of etherified starch, esterified starch, and a mixture thereof, (b) packing the solution into a container followed by sealing; and (c) sterilizing the solution by heating any time of before, during, or after step (b) is conducted, the ingredients described above preferably can be added during and/or following the preparation step (a), and before the packing step (b).

(6-b). Packing and Sealing of the Liquid Food

The given volume of the solution comprising psyllium and viscosity-reducing polysaccharide can be charged to a container and then sealed to manufacture a liquid food product. The material, shape, and structure of the container are not specifically limited as long as the container has a structure that can be sealed after packing, and has sufficient properties to serve as a barrier, while it should be resistant to the elevated inner pressure which is imparted through heating when heat sterilization is conducted after the packing and sealing step. For example, a standing-pouch type, a gazette type, a flat pouch type, made of laminated material comprising paper and plastic film or comprising plastic film and metal foil such as aluminum foil, as well as plastic container, metal can, bottle, or the like suitably can be employed as the container.

(6-c). Heat Sterilization

Heat sterilization of the solution comprising psyllium and viscosity-reducing polysaccharide can be conducted at any time prior to, during, or following the above packing step (b). The conditions for sterilization can be suitably determined depending upon the pH of the liquid to be sterilized and the shape of the container. For example, when a liquid having pH 4 or lower is packed into a pouch type container made of aluminum, the primary sterilization can be conducted prior to packing into the container, at 90° C. for 2 minutes using a tubular type heat exchanger, then after the container is sealed following packing, steam sterilization can be carried out at 90° C. for about 10 minutes in a sterilization steamer.

7. Application to Powdered Food for Preparing Liquid Food

Another embodiment which relates to a powdered food for preparing a liquid food is described below in detail.

A. Psyllium

In this embodiment, psyllium can be any of which as described above, including commercially available powdered psyllium and psyllium seed gum. The purification method as well as particle size of the psyllium are not particularly limited. In respect of the delayed onset of viscosity elevation, the particles preferably are coarse. Granulated psyllium, as well as the coated psyllium using hydrogenated fat/oil or zein (a kind of protein derived from corn), can be suitably employed. When psyllium is granulated, further delay of the onset of the elevated viscosity is expected by adding an organic acid such as ascorbic acid or citric acid. Preferably, the particle size of psyllium or granulated psyllium is similar to that of the granulated polysaccharide as detailed below, in view of the possible spontaneous separation of the powder which occurs in a time-dependent manner.

B. Granulated Polysaccharide (a) Particle Size of the Polysaccharide

A larger particle size of the granulated viscosity-reducing polysaccharide in accordance with the present invention is apt to provide a stronger psyllium viscosity-reducing effect (see Example 12). The particle size distribution of the granulated polysaccharide is not specifically limited. However, if the polysaccharide comprises 70% by weight or more of the particles being unable to pass through the 140 mesh sieve (140 mesh on), the desirable psyllium viscosity-reducing effect, handling feasibility and solubility of the food product, as well as preferable dispersion property and bulk density, can be provided (see Example 12).

The method of granulation is not limited, as long as granules are provided, thus for example, fluidized bed granulation, spray granulation, tumbling granulation, extruding granulation, agitation granulation, and disintegration granulation can be appropriately selected. Among these methods, fluidized bed granulation can be suitably employed using a fluidized bed granulator in view of a better producibility, costs of manufacture, and a solubility of the resulting polysaccharide.

(b) Selection of the Polysaccharide

A polysaccharide used in this invention is not specifically limited, except for the limitation as described above, namely having a molecular weight of 20,000 or greater and the viscosity of an aqueous solution at 2% by weight of 9.0 cp or less, preferably 5.0 cp or less when determined using a type B viscometer with Rotor No. 1 at 60 rpm and 25° C. The molecular weight herein is calculated as above described.

The source of a polysaccharide according to this invention can be those listed above in Section 1. Preferably, the polysaccharide can be gelatinized thereby leading to a suitable solubility. Among those polysaccharides, acid-treated gelatinized potato starch, waxy cornstarch octenyl succinate, acid-treated hydroxypropyl etherified tapioca starch, or any mixture thereof can exert more advantageous effects.

(c) Polysaccharide Content

As described in the above Section 2, the amount of the polysaccharide added relative to the amount of psyllium can vary depending on the concentration of the psyllium and the viscosity of the polysaccharide itself. Thus, the psyllium viscosity-reducing effect of the polysaccharide according to the invention can be increased corresponding to the increase in the amount added, to a certain extent of the concentration (amount added) which can vary depending on the source and the modification of the polysaccharide employed. For example, as shown in Example 3, when acid-treated hydroxypropyl etherified tapioca starch was used as a psyllium viscosity-reducing polysaccharide, the viscosity resulting from psyllium still can be reduced in an amount of the starch which is one-eighth by weight of psyllium. Besides, when the amount of the polysaccharide is increased to more than 30% by weight, the viscosity is apt to be increased due to the viscosity of the polysaccharide itself. Accordingly, the amount of the polysaccharide added can be suitably adjusted to attain desirable viscosity resulting from psyllium.

C. Preparation of Psyllium Composition, and Method of Manufacturing a Powdered Food A psyllium composition in accordance with this invention can be prepared by mixing the powder of both of psyllium and the polysaccharide as above described in the foregoing section.

The powdered food product can be for example, powdered juice mix and powdered instant soup mix, which can be manufactured by adding powdered ingredients suitably, such as fruit juice powdered, granulated sugar, seasoning/flavoring materials and the like, ad libitum. When a starch is employed as the polysaccharide, a prior gelatinization can be preferably conducted to improve starch solubility. Further, psyllium can be granulated prior to mixing with or without the additional powdered ingredients, in order to avoid the formation of insoluble solid cakes.

EXAMPLES

The present invention is further detailed in the following Examples, however such Examples are intended to be nothing more than illustration, and should not be construed as restriction of the present invention.

In the following Examples, viscosity was determined using a type B viscometer (TOKYO KEIKI, Model B8L) at 25° C. Molecular weight was determined by subjecting a 0.2 ml sample to a gel filtration chromatography (Pharmacia Fine Chemicals, FPLC) equipped with a packed gel filtration column ($\phi$ 15 mm×75 cm, TOSO, TSKgel, TOYOPEARL HW-65), which was eluted with purified water and detected with a differential refractometer at the flow rate of 0.8 ml/min. As a standard substance for determining the molecular weight, pullulan (WATERS Co.) was employed. In the following Examples, any % which indicates a content is % by weight.

Example 1

Psyllium Viscosity-Reducing Ability of the Modified Starch

Among psyllium viscosity-reducing polysaccharides according to the invention, modified starches were examined for their psyllium viscosity-reducing abilities. First, 96 g of ion exchanged water was admixed with 2 g of each of the modified starches shown in Table 1 (Sample Nos. 1 to 13), which was dissolved with heating and then cooled, and the viscosity was determined using Rotor No. 1 at 60 rpm. Subsequently, 2 g of the psyllium powder (Dainippon Pharmaceutical Co., Ltd., HEALTHY GUM™) was added to the aqueous solution, and the viscosity of the resulting solution was determined using Rotor No. 2 at 1.5 rpm. The results are illustrated in Table 1 shown below.

TABLE 1

| No. | Source | Modification Method | Molecular Weight (kD) | Viscosity of 2% Polysaccharide Solution (cp) | Viscosity with 2% Psyllium Solution (cp) | Viscosity Reducing Effect |
|---|---|---|---|---|---|---|
|   | —       | —                                                                              | —        | —     | 10900–12940 | —  |
| 1 | Potato  | (Unmodified)                                                                   | 1620/770 | >100  | >20000      | x  |
| 2 | Waxy Corn | (Unmodified)                                                                 | 2870     | 69.7  | >20000      | x  |
| 3 | Cornstarch | Heated (Overdried)                                                          | 2100     | 9.4   | >20000      | x  |
| 4 | Tapioca | Oxidized Hydroxypropyl Etherified                                              | 3100     | 15.4  | 13660       | x  |
| 5 | Potato  | Heated in the Presence of Acid, Degraded with Amylase (Indigestible Dextrin)   | 2.4      | <5    | 13560       | x  |
| 6 | Tapioca | Acid-treated Hydroxypropyl Etherified                                          | 2110     | <5    | 6370        | o  |
| 7 | Tapioca | Oxidized                                                                       | 2310     | <5    | 4620        | o  |
| 8 | Waxy Corn | Octenyl Succinated                                                           | 3400     | <5    | 3480        | o  |
| 9 | Potato  | Acid-treated Gelatinized                                                       | 1890     | <5    | 3290        | o  |
| 10 | Tapioca | Oxidized                                                                      | 3400     | <5    | 4120        | o  |
| 11 | Potato  | Oxidized                                                                      | 1650     | <5    | 2640        | o  |
| 12 | Tapioca | Oxidized                                                                      | 1600     | 8.2   | 4100        | o  |
| 13 | Tapioca | Oxidized                                                                      | 1580     | <5    | 3220        | o  |

Based on the results indicated from Table 1, it was concluded as follows.
(1) There is no correlation between the psyllium viscosity-reducing ability and the source of the starch.
(2) When the concentration of the aqueous solution of the psyllium is high (Sample Nos. 1 and No. 2), no viscosity-reducing effect could be exerted.
(3) Each of Sample Nos. 6 to 13, namely, the acid-treated hydroxypropyl etherified tapioca starch, the oxidized tapioca starch, the waxy cornstarch octenyl succinate, the acid-treated gelatinized potato starch, the oxidized potato starch, exerted the psyllium viscosity (thickening/gelling)-reducing effect.

The potato starch of Sample No. 1 exhibited two peaks in the determination of the molecular weight by the gel filtration chromatography, suggesting that it was a mixture of two distinct polysaccharides.

As described above, the psyllium viscosity-reducing ability was affected by the molecular weight of the starch and the viscosity of the aqueous solution of the starch, and such ability was observed with modified starches having a molecular weight of 20,000 or greater and viscosity of an aqueous solution at 2% by weight of 9.0 cp or less (determined using a type B viscometer with Rotor No. 1, at 60 rpm and 25° C.).

Example 2

Psyllium Viscosity-Reducing Ability of Polysaccharide Other Than Modified Starch Ninety-six grams of ion exchanged water was admixed with 2 g of each of the polysaccharides (Sample Nos. 1 to 7), which was dissolved with heating, and then admixed with 2 g of psyllium similarly as in Example 1, cooled and then subjected to the determination of the viscosity. The results are shown in Table 2.

TABLE 2

| No. | Source | Molecular Weight (kD) | Viscosity of 2% Polysaccharide Solution (cp) | Viscosity with 2% Psyllium Solution (cp) | Viscosity Reducing Effect |
|---|---|---|---|---|---|
|   | —                             | —       | —    | 10900–12940 | —  |
| 1 | Polydextrose                  | 1.4     | <5   | 15410       | x  |
| 2 | Pectin                        | 1350/13 | 15.7 | 11720       | x  |
| 3 | Gum Arabic                    | 1780    | <5   | 8140        | o  |
| 4 | Arabinogalactan               | 350     | <5   | 6800        | o  |
| 5 | Partially Decomposed Guar Gum | 22.5    | <5   | 6730        | o  |
| 6 | Pullulan                      | 180     | 5.6  | 4250        | o  |
| 7 | Soybean Derived Dietary Fiber | 1380    | 5.1  | 3830        | o  |

Based on the results indicated from Table 2, it was concluded as follows:
(1) Each of Sample Nos. 3 to 7, namely, gum arabic, arabinogalactan, partially decomposed guar gum, pullulan and the soybean-derived dietary fiber, exerted the psyllium viscosity-reducing effect.

(2) The polydextrose, i.e., Sample No. 1, had no psyllium viscosity-reducing ability. The pectin, i.e., Sample No. 2, could exert almost no psyllium viscosity-reducing effect.

(3) Similarly as in the case of the starches in Example 1, the psyllium viscosity-reducing ability of the polysaccharide was affected by the molecular weight and the viscosity of the aqueous solution of the polysaccharide, and such ability was observed with the polysaccharide having a molecular weight of 20,000 or greater and viscosity of an aqueous solution at 2% by weight of 9.0 cp or less (determined using a type B viscometer with Rotor No. 1, at 60 rpm and 25° C.).

The pectin of Sample No. 2 exhibited two peaks in the determination of the molecular weight by the gel filtration chromatography, suggesting that it was a mixture of two polysaccharides.

Example 3

Concentration of Polysaccharide

In order to investigate the correlation between the concentration of the polysaccharide employed and the psyllium viscosity-reducing effect, the following experiment was conducted. The aqueous solutions of acid-treated hydroxypropyl etherified tapioca starch at the concentrations of 0.25%, 0.5%, 1%, 2.5%, 10%, 20%, 30%, and 40%, and the aqueous solutions of gum arabic or arabinogalactan at the concentrations of 0.5%, 1%, 2%, and 3%, were prepared respectively, and each solution was admixed with 2% of psyllium, cooled and examined for its viscosity similarly as in Example 1. The results are indicated in Tables 3 and 4 shown below.

TABLE 3

Acid-treated Hydroxypropyl Etherified Tapioca Starch

| Polysaccharide Concentration (% by weight) | Viscosity with 2% Psyllium Solution (cp) | Viscosity with 1% Psyllium Solution (cp) |
| --- | --- | --- |
| 0 | 14210 | 434 |
| 0.25 | 12090 | 343 |
| 0.5 | 9900 | 336 |
| 1 | 8840 | 306 |
| 2 | 6370 | 250 |
| 5 | 4040 | 110 |
| 10 | 580 | 51 |
| 20 | 627 | 150 |
| 30 | 1970 | 744 |
| 40 | 5350 | >1000 |

TABLE 4

| Polysaccharide Concentration | Viscosity with 2% Psyllium Solution (cp) | |
| --- | --- | --- |
| (% by weight) | Gum Arabic | Arabinogalactan |
| 0 | 14210 | 14210 |
| 0.5 | 10600 | 8050 |
| 1 | 6420 | 6860 |
| 2 | 5630 | 6370 |
| 3 | 6510 | 4990 |

Based on the results from Tables 3 and 4, the following conclusions were obtained.

When the acid-treated hydroxypropyl etherified tapioca starch was combined with the 2% psyllium solution or the 1% psyllium solution, a concentration up to 20% of the starch caused a reduction in the viscosity resulting from the psyllium. In addition, the 2% psyllium solution tended to increases in viscosity at a concentration of starch exceeding 30%, although some extent of viscosity-reducing effect was observed. An increase in the viscosity of the 1% psyllium solution was observed, compared with the polysaccharide-free control, when the starch was employed at a concentration exceeding 30%. Such tendencies of increased viscosity at higher starch concentration levels may be due to the viscosity of the polysaccharide itself.

In the 2% psyllium solution, the viscosity of the psyllium solution tended to be reduced with gum arabic at 2% or less, or with arabinogalactan at 3% or less.

Example 4

Method for Producing Hydrate of Psyllium With Polysaccharide

In this Example, acid-treated hydroxypropyl etherified tapioca starch was used as the polysaccharide (the modified starch) to form the hydration system using one of four different procedures. The water employed was ion exchanged water. Dissolution with heating and the high temperature treatment all were conducted in a boiling water bath for 10 minutes, followed by cooling to 25° C.

The following procedure was conducted to form each hydration system so that the concentrations of the polysaccharide and the psyllium after forming the hydration system was 10% and 2%, respectively, and the viscosity of the solution was determined using Rotor No. 2 at 30 rpm.

Samples

Sample 1: Eighty-eight grams of water were admixed with 10 g of the modified starch, heated to effect dissolution, followed by cooling, and then admixed with 2 g of psyllium, heated, cooled, and subjected to determination of viscosity.

Sample 2: A mixture of 10 g of the modified starch powder and 2 g of psyllium was added to 88 g of water, thereafter heated, followed by cooling, and then subjected to determination of viscosity.

Sample 3: An aqueous solution of 10 g of the modified starch in 40 g of water, obtained by heating to achieve dissolution, was admixed with a solution of 2 g of psyllium in 48 g of water also obtained by heating to achieve dissolution, then heated, cooled, and subjected to determination of viscosity.

Sample 4: Eighty-eight grams of water were admixed with 2 g of psyllium and heated to effect dissolution, followed by cooling, and then admixed with 10 g of the modified starch, heated, cooled, and subjected to determination of viscosity.

The viscosity of each sample solution is illustrated in Table 5 below.

TABLE 5

| Sample No. | Viscosity (cp) |
| --- | --- |
| Control | >1000 (Undetectably Viscous) |
| 1 | 234 |
| 2 | 261 |
| 3 | 304 |
| 4 | 273 |

From these results, the acid-treated hydroxypropyl etherified tapioca starch exerted a psyllium viscosity-reducing effect regardless of the order of the addition of the psyllium and polysaccharide, and regardless of the procedure for preparing the hydration system.

Example 5

Heat Resistance of Psyllium Viscosity-Reducing Ability

As described above, the hydration system of psyllium has been known to exhibit a significant increase in viscosity through heating. In order to investigate how the psyllium viscosity-reducing effect of the polysaccharide is affected by heating, the following heat resistance test was conducted.

The water employed was ion exchanged water. A psyllium was used at the concentration of 2%, and acid-treated hydroxypropyl etherified tapioca starch was employed as the polysaccharide (the modified starch) at a concentration of 10%.

(1) When only psyllium was dissolved in water, the viscosity of the solution was 14210 cp (determined using Rotor No. 2 at 1.5 rpm).

(2) When psyllium and modified starch were dissolved in water, the viscosity of the solution was 302 cp (determined using Rotor No. 2 at, 30 rpm).

(3) When the viscosity of each of the aqueous solutions (1) and (2) described above was determined after heating in a boiling water bath for 10 minutes, followed by cooling, aqueous solution (1) containing only the psyllium led to formation of a glutinous cake-like gel with an increase in viscosity up to 100,000 cp or greater, while aqueous solution (2) supplemented with the modified starch did not increase in viscosity and kept the viscosity as low as 234 cp (determined using Rotor No. 2 at 30 rpm). Thus, it was evident that the addition of polysaccharide imparts a heat-resistant psyllium viscosity-reducing ability.

Example 6

Effect of Addition of Polysaccharide on Water-Retaining Capacity of Psyllium A polysaccharide according to the invention was added to the psyllium hydration system resulting in a reduced viscosity (thickening/gelling), and then the water-retaining capacity of the psyllium hydration system was determined. Various physiological effects exerted by psyllium, such as an intestinal function-controlling effect, is considered to be due to the water-retaining capacity of the psyllium. Therefore, the water-retaining capacity of the hydration system was determined to ensure that the physiological effects of the psyllium were still preserved even after addition of the polysaccharide according to the invention. A biological digestion model assuming the digestion in a stomach and a small intestine was employed in the determination procedure.

Samples

Control: 2 g of psyllium;

Sample 1: 2 g of psyllium with polysaccharides (10 g of acid-treated hydroxypropyl etherified tapioca starch and 0.5 g of gum arabic);

Sample 2: 2 g of psyllium with polysaccharides (6 g of acid-treated hydroxypropyl etherified tapioca starch and 0.5 g of gum arabic); and Sample 3: 2 g of psyllium with polysaccharides (log of oxidized tapioca starch and 0.5 g of gum arabic).

Procedure

Four hundred grams of an aqueous solution containing the components described above (0.5% by weight of psyllium) was prepared and 10 g of this aqueous solution was subjected to the following process. The solution was adjusted to pH 2 with 2N HCl and admixed with 50 mg of pepsin to effect enzymatic digestion at 37° C. for 4 hours. Then, 500 mM phosphate buffer, pH 7.2, was added at a final concentration of 20 mM. Thereafter, the solution was adjusted to pH 7.2 with 2N NaOH. One hundred and fifty mg of pancreatin was added to effect enzymatic digestion at 37° C. for 3 hours. The solution was centrifuged at 14,000×G for 10 minutes, and the volume of the supernatant was measured. The volume, after subtracting the volume of the supernatant thus obtained from the volume of the water added (including HCl aqueous solution, phosphate buffer and NaOH aqueous solution), was divided by the amount of the psyllium, whereby obtaining the water-retaining capacity.

The results are shown in Table 6 below.

TABLE 6

| Sample No. | Water-Retaining Capacity (g-water/g-psyllium) | Relative Ratio (%) |
| --- | --- | --- |
| Control | 43.9 | 100 |
| 1 | 30.3 | 69 |
| 2 | 38.6 | 88 |
| 3 | 34.0 | 77 |

As evident from Table 6, approximately 70% or greater of the control water-retaining capacity was shown to be preserved throughout the above procedure. This Example thus suggests that a composition of the present invention, comprising the polysaccharide and psyllium, can serve to retain water in a large intestine even after being eaten and digested in a stomach as well as in a small intestine, whereby providing its excellent intestinal function-controlling effect.

Example 7

Psyllium Viscosity-Reducing Ability of the Modified Starch Upon Heating

Procedure

Eighty-eight g of ion exchanged water was admixed with 2 g of each of the modified starches shown in Table 7 (Sample Nos. 1 to 5), which was dissolved with heating and then cooled to below 25° C. Then, 2 g of psyllium was admixed, and the viscosity was determined using Rotor No. 2 at 30 rpm. Subsequently, the solution was heated for 10 minutes in a boiling water bath, then cooled again to below 25° C., followed by homogenization using a food mill, and the viscosity of the respective solution was determined using Rotor No. 2 at 30 rpm. At the same time, the appearance of the hydrate, namely whether the gel mass was formed or not, was observed with respect to each of the samples. As a control, a similar procedure was carried out using a sample without addition of the starch. The results are shown in Table 7 below, together with the molecular weight and the viscosity of a 2% aqueous solution of each of the samples.

TABLE 7

| Sample No. | Modified Starch | Molecular Weight (kD) | Viscosity of 2% Solution (cp) | Before Heating Viscosity (cp) | After Heating Viscosity (cp) | Gel Formation Ability |
|---|---|---|---|---|---|---|
| Control | None | — | — | >1000* | >1000* | + (hard gel formed) |
| 1 | Acid-treated Gelatinized | 1890 | <5 | 215 | >1000* | + |
| 2 | Oxidized Potato Starch | 1650 | <5 | 332 | >1000* | + |
| 3 | Oxidized Tapioca Starch | 3400 | <5 | 354 | >1000* | + |
| 4 | Acid-treated Hydroxypropyl Etherified Tapioca Starch | 2110 | <5 | 302 | 195 | — |
| 5 | Waxy Cornstarch Octenyl Succinate | 3400 | <5 | 416 | 237 | — |

*Undetectable level due to a remarkable increase of viscosity.

Results

As evident from Table 7, column entitled "Before Heating," the onset of increased viscosity resulting from psyllium can be prevented when each of the modified starches (Sample Nos. 1–5) according to the present invention is included in the hydration system of psyllium in an aqueous solution. Furthermore, after these aqueous solutions were heated, the control sample including psyllium alone showed a remarkable increase of viscosity, which reaches to greater than 100,000 cp, while Sample Nos. 4 or 5, which comprises acid-treated hydroxypropyl etherified tapioca starch or waxy cornstarch octenyl succinate respectively, did not show any gel formation, and still retained a low viscosity. Meanwhile, when the other modified starches were employed (Sample Nos. 1–3), formation of a gel mass occurred, leading to an extreme increase in viscosity around the mass area. Therefore, these modified starches were considered as unsuitable as an ingredient of a liquid food comprising psyllium, which is manufactured through a process comprising heat sterilization. Accordingly, when manufacturing a present liquid food is intended, etherified or esterified starch, particularly, acid-treated hydroxypropyl etherified tapioca starch or waxy cornstarch octenyl succinate, can be efficiently used.

Example 8

Amount of Modified Starch to be Added

Procedure

Acid-treated hydroxypropyl etherified tapioca starch (as employed in Example 7) was admixed with ion exchanged water at final concentrations ranging between 0 to 30%, then dissolved with heating followed by cooling. To each of the solutions, 0.33% citric acid, 11.85% fructose-glucose-liquid sugar, and 2% psyllium were added, mixed, thereafter heated for 10 minutes in a boiling water bath. Then, the fluidity and palatability of each sample was evaluated, both after the addition of psyllium and after heating. When the fluidity of the sample including the formed gel was evaluated, the gel was crushed prior to the evaluation.

Results

Without addition of the starch to the 2% psyllium solution, a gel was formed that could not be fractured by crushing due to its viscous/sticky property. Thereby, the fluidity of the solution could not be attained. When starch was added at a concentration of 1%, fluidity still could be sustained after addition of psyllium. However, the solution became viscous after heating, thus leading to gel formation and to inferior fluidity. Meanwhile, when the starch was added at a concentration of 2% or more, the reduction of viscosity/gel strength could be achieved both before and after the heating, and with respect to the appearance of the gel, such a gel could be easily dispersed and homogenized through crushing. Hence, a solution having better fluidity could be obtained by the addition of the starch at such concentrations. Therefore, the prepared solution is readily passed into the apparatus for packing, and thereby a liquid food having a superior handling feasibility can be provided. However, when the starch was added at more than or equal to 20%, the palatability may be inferior with gooey and sticky feelings. Therefore, based on the results from evaluation of handling feasibility (i.e., fluidity) and palatability, the suitable range of the modified starch preferably is between 2% to 20%, and more preferably between 6% to 15%.

Example 9

Amount of Psyllium to be Added

Procedure

Acid-treated hydroxypropyl etherified tapioca starch (as employed in Example 7) was admixed with ion exchanged water at the final concentrations of 10%, then dissolved with heating followed by cooling. To this solution, 0.33% citric acid, 11.85% fructose-glucose-liquid sugar, and psyllium at concentrations between 0.5% to 10% were added, mixed, and thereafter heated for 10 minutes in a boiling water bath. Then, the fluidity and palatability of each sample were evaluated, both after the addition of psyllium and after heating. When the fluidity of the sample including the formed gel was evaluated, the gel was crushed prior to the evaluation.

Results

When starch was added at a concentration of 10%, the viscosity increased enormously leading to unfavorable palatability at a concentration of psyllium of 7.5% or more. When psyllium was added at 3% or less, favorable fluidity was observed without any gel formation, even after a heat treatment was conducted. Besides, when psyllium was added at 4 to 5%, although a gel was formed, a suitable fluidity could be achieved through dispersion of the gel by milling it to homogeneity. Accordingly, the preferable range of psyllium can be 5% or less, based on the results of evaluating on handling feasibility (fluidity) and palatability.

Example 10

Water-Retaining Capacity of a Beverage Manufactured According to the Present Invention For the purpose of investigating whether the capacity of psyllium to retain water is preserved in a beverage according to the present invention, a similar experiment was conducted as in above Example 6 using a biological digestion model assuming the digestion in a stomach and a small intestine.

Sample

Seven hundred and seventy g of ion exchanged water was admixed with 80 g acid-treated hydroxypropyl etherified tapioca starch (as employed in Example 7), 5 g gum arabic, and 10 g dextrin (DE: 2–5), then dissolved with heating, followed by cooling to below 25° C. Subsequently, 60.25 g fructose-glucose-liquid sugar, 32 g granulated sugar, 20 g psyllium, 2.75 g citric acid, and 20 g grape juice concentrated to one fifth were added to the solution and mixed. Thereafter, a flavor was added. The mixture then was sterilized by heating at 90° C. for 2 minutes. The gel formed by this procedure was disrupted using a static mixer to prepare 1000 g of a beverage. This beverage was dispensed into a pouch-type container made of aluminum to contain 200 g. After sealing the container, heat sterilization was conducted again at 90° C. for 10 minutes to manufacture a grape flavored beverage product comprising psyllium. In this embodiment, gum arabic was added in order to attain a synergistic effect of reducing viscosity by combining with the above-described tapioca starch, and to improve the palatability of the product.

Measurement of the Water-Retaining Capacity

To 2.5 g of the beverage manufactured as in the preceding section, 7.5 g of ion exchanged water was added. Then, the resulting solution of 10 g was adjusted to pH 2 with 2N HCl and admixed with 50 mg of pepsin to effect enzymatic digestion at 37° C. for 4 hours. Subsequently, 500 mM phosphate buffer, pH 7.2, was added at a final concentration of 20 mM. Thereafter, the solution was adjusted to pH 7.2 with 2N NaOH. One hundred and fifty mg of pancreatin was added to effect enzymatic digestion at 37° C. for 3 hours. The mixture was centrifuged at 14,000×G for 10 minutes, and the volume of the supernatant was measured. The volume, after subtracting the volume of the supernatant thus obtained from the volume of the water added (including HCl aqueous solution, phosphate buffer and NaOH aqueous solution), was divided by the amount of the psyllium, thereby obtaining the water-retaining capacity.

The results are shown in Table 8 below.

TABLE 8

| Sample | Water-Retaining Capacity (g-water/g-psyllium) | Relative Ration (%) |
|---|---|---|
| Control | 45.5 | 100 |
| Grape-flavored beverage | 37.5 | 82 |

As evident from Table 8, 80% or greater of the control water-retaining capacity was preserved with the present beverage comprising psyllium, throughout the above procedure. This result suggests that a liquid food product of the present invention comprising psyllium can serve to retain water in a large intestine even after being eaten and digested in a stomach as well as in a small intestine.

Example 11

Psyllium Viscosity-Reducing Ability of Granulated Polysaccharide

Procedure

Figure 2:
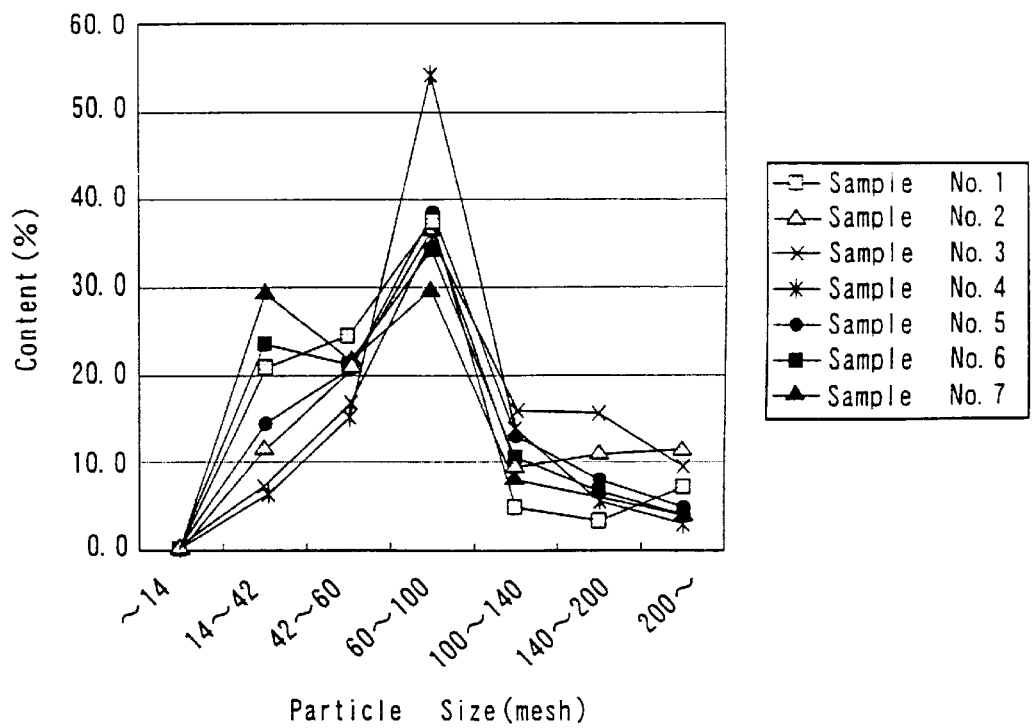
FIG. 2 illustrates a graph showing the particle size distribution of the polysaccharides as in FIG. 1, which were granulated in accordance with one embodiment of the present invention.

To 212.3 g water, the previously mixed powder of both of 4.4 g psyllium and 3.3 g each polysaccharide shown in Table 9 (Sample Nos. 1 to 7) were admixed and was dissolved, then the time dependent change in viscosity was determined. The polysaccharides employed were granulated and ungranulated. The granulated polysaccharides were prepared by a fluidized bed granulation method. The particle size distribution of the granulated polysaccharides is shown in Table 11 and FIG. 2, while that of ungranulated polysaccharides is shown in Table 10 and FIG. 1. Table 12 and FIG. 3 illustrate the results of measured viscosity of the aqueous solution comprising each of the polysaccharides and psyllium.

TABLE 9

| Sample No. | Source and Modification Method | Molecular Weight (kD) | Viscosity of 2% Aqueous Solution (cp) |
|---|---|---|---|
| 1 | Acid-treated gelatinized potato starch | 1890 | <5 |
| 2 | Waxy cornstarch octenyl succinate | 3400 | <5 |
| 3 | Partially decomposed guar gum | 22.5 | <5 |
| 4 | Gum arabic | 1780 | <5 |
| 5 | Dextrin (DE 2-5) cornstarch | — | <5 |
| 6 | Blanched Dextrin (DE 8.0 ± 1.0) cornstarch | — | <5 |
| 7 | Dextrin (DE 16-21) cornstarch | — | <5 |

TABLE 10

Particle Size Distribution of Ungranulated Polysaccharide

| Particle Size (mesh) | Sample No. 1 | | Sample No. 2 | | Sample No. 3 | | Sample No. 4 | | Sample No. 5 | | Sample No. 6 | | Sample No. 7 | |
|---|---|---|---|---|---|---|---|---|---|---|---|---|---|---|
| <14 | 0.8 | 0.8 | 0.7 | 0.7 | 0.6 | 0.6 | 0.3 | 0.3 | 0.3 | 0.3 | 0.3 | 0.3 | 1.4 | 1.4 |
| 14–42 | 2.7 | 3.5 | 1.2 | 1.9 | 2.4 | 3.0 | 1.8 | 2.1 | 1.6 | 1.9 | 5.0 | 5.3 | 3.9 | 5.3 |
| 42–60 | 2.7 | 6.2 | 3.1 | 5.0 | 2.4 | 5.4 | 2.4 | 4.5 | 2.4 | 4.3 | 4.1 | 9.4 | 2.2 | 7.5 |
| 60–100 | 1.4 | 7.6 | 3.7 | 8.7 | 4.1 | 9.5 | 1.1 | 5.6 | 8.4 | 12.7 | 7.5 | 16.9 | 4.2 | 11.7 |
| 100–140 | 2.9 | 10.5 | 15.0 | 23.7 | 15.6 | 25.1 | 8.4 | 14.0 | 22.4 | 35.1 | 18.8 | 35.7 | 12.1 | 23.8 |
| 140–200 | 19.5 | 30.0 | 31.4 | 55.1 | 23.6 | 48.7 | 27.6 | 41.6 | 28.9 | 64.0 | 28.1 | 63.8 | 31.8 | 55.6 |
| >200 | 70.0 | 100.0 | 44.9 | 100.0 | 51.3 | 100.0 | 58.3 | 100.0 | 35.9 | 100.0 | 36.1 | 100.0 | 44.5 | 100.0 |

For each sample, left column presents content (% (w/w)), and right column presents cumulative content (% (w/w)).

TABLE 11

Particle Size Distribution of Granulated Polysaccharide

| Particle Size (mesh) | Sample No. 1 | | Sample No. 2 | | Sample No. 3 | | Sample No. 4 | | Sample No. 5 | | Sample No. 6 | | Sample No. 7 | |
|---|---|---|---|---|---|---|---|---|---|---|---|---|---|---|
| <14 | 0.3 | 0.3 | 0.6 | 0.6 | 0.9 | 0.9 | 0.4 | 0.4 | 0.4 | 0.4 | 0.1 | 0.1 | 0.8 | 0.8 |
| 14–42 | 21.2 | 21.4 | 11.4 | 12.0 | 6.1 | 7.0 | 7.1 | 7.5 | 14.4 | 14.8 | 23.6 | 23.7 | 29.5 | 30.3 |
| 42–60 | 24.6 | 46.0 | 20.0 | 32.0 | 16.5 | 23.5 | 15.0 | 22.5 | 20.1 | 34.9 | 21.2 | 44.9 | 21.8 | 52.1 |
| 60–100 | 38.2 | 84.2 | 36.5 | 68.5 | 35.2 | 58.6 | 55.1 | 77.6 | 38.8 | 73.8 | 34.1 | 79.0 | 30.1 | 82.2 |
| 100–140 | 5.1 | 89.3 | 9.3 | 77.8 | 16.0 | 74.6 | 14.1 | 91.7 | 13.2 | 87.0 | 10.6 | 89.6 | 8.0 | 90.2 |
| 140–200 | 3.4 | 92.7 | 10.8 | 88.6 | 15.7 | 90.3 | 5.5 | 97.2 | 8.2 | 95.2 | 6.6 | 96.2 | 5.8 | 96.0 |
| >200 | 7.3 | 100.0 | 11.4 | 100.0 | 9.7 | 100.0 | 2.7 | 100.0 | 4.8 | 100.0 | 3.8 | 100.0 | 4.0 | 100.0 |

For each sample, left column presents content (% (w/w)), and right column presents cumulative content (% (w/w)).

TABLE 12

| Time after Dissolution (min) | Psyllium alone | Sample No. 1 | | Sample No. 2 | | Sample No. 3 | | Sample No. 4 | | Sample No. 5 | | Sample No. 6 | | Sample No. 7 | |
|---|---|---|---|---|---|---|---|---|---|---|---|---|---|---|---|
| | | U | G | U | G | U | G | U | G | U | G | U | G | U | G |
| 2 | 710 | 210 | 186 | 154 | 114 | 346 | 370 | 104 | 80 | 690 | 510 | 872 | 544 | 998 | 700 |
| 4 | 1908 | 474 | 378 | 340 | 324 | 746 | 620 | 180 | 150 | 1336 | 1342 | 1764 | 1262 | 1900 | 1578 |
| 6 | ND* | 610 | 418 | 630 | 484 | 1062 | 1004 | 272 | 230 | ND* | ND* | ND* | ND* | ND* | ND* |
| 8 | ND* | 702 | 656 | 908 | 650 | 1280 | 1228 | 410 | 318 | ND* | ND* | ND* | ND* | ND* | ND* |
| 10 | ND* | 1036 | 772 | 1418 | 900 | 1410 | 1382 | 568 | 394 | ND* | ND* | ND* | ND* | ND* | ND* |
| 15 | ND* | 1106 | 800 | 1522 | 1186 | 1484 | 1464 | 600 | 450 | ND* | ND* | ND* | ND* | ND* | ND* |

*Undetectable due to a remarkable increase in viscosity
For each sample, left column (U) presents values obtained from ungranulated polysaccharide, and right column (G) presents values obtained from granulated polysaccharide.

Results

As shown in Table 12 and FIG. 3, the onset of increased viscosity resulting from psyllium can be prolonged when each of the polysaccharides (Sample Nos. 1–7) were granulated. Further, a prominent effect to prolong the onset of the elevated viscosity can be observed when Sample No. 1 (acid-treated gelatinized potato starch), Sample No. 2 (waxy cornstarch octenyl succinate), or Sample No. 4 (gum arabic), was employed as the polysaccharide. Sample No. 6, i.e., blanched dextrin (DE: 8.0±1.0) followed to exhibit the some extent of the effect. Sample No. 3 (partially decomposed guar gum), and Sample Nos. 5 and 7, i.e., dextrin (respectively, DE: 2–5 and 16–21) also exhibited slight effects to prolong the onset of the elevated viscosity.

Example 12

Effect to Prolong the Onset of Elevated Viscosity by Each Fraction of Granulated Polysaccharides Having Specified Particle Size Procedure Sample No. 2 in the above Example 11 (waxy cornstarch octenyl succinate) was granulated followed by fractionation into: 42 mesh on, 60–100 mesh, and 140–200 mesh, and these fractions were subjected to analysis as in the above Example 11 on the time dependent alteration of the viscosity of the aqueous solutions. The results are shown in Table 13 and FIG. 4.

TABLE 13

| Time after Dissolution (min) | Sample No. 2 (Waxy Cornstarch Octenyl Succinate) Viscosity of Solution (cp) | | | | |
|---|---|---|---|---|---|
| | 42 mesh on | 60–100 mesh | 140–200 mesh | Un-granulated | Granulated |
| 2 | 110 | 120 | 130 | 154 | 114 |
| 4 | 282 | 286 | 312 | 340 | 324 |
| 6 | 440 | 506 | 534 | 630 | 484 |
| 8 | 552 | 734 | 778 | 908 | 650 |
| 10 | 704 | 802 | 1060 | 1418 | 900 |
| 15 | 1090 | 1188 | 1482 | 1522 | 1186 |

Results

Figure 4:
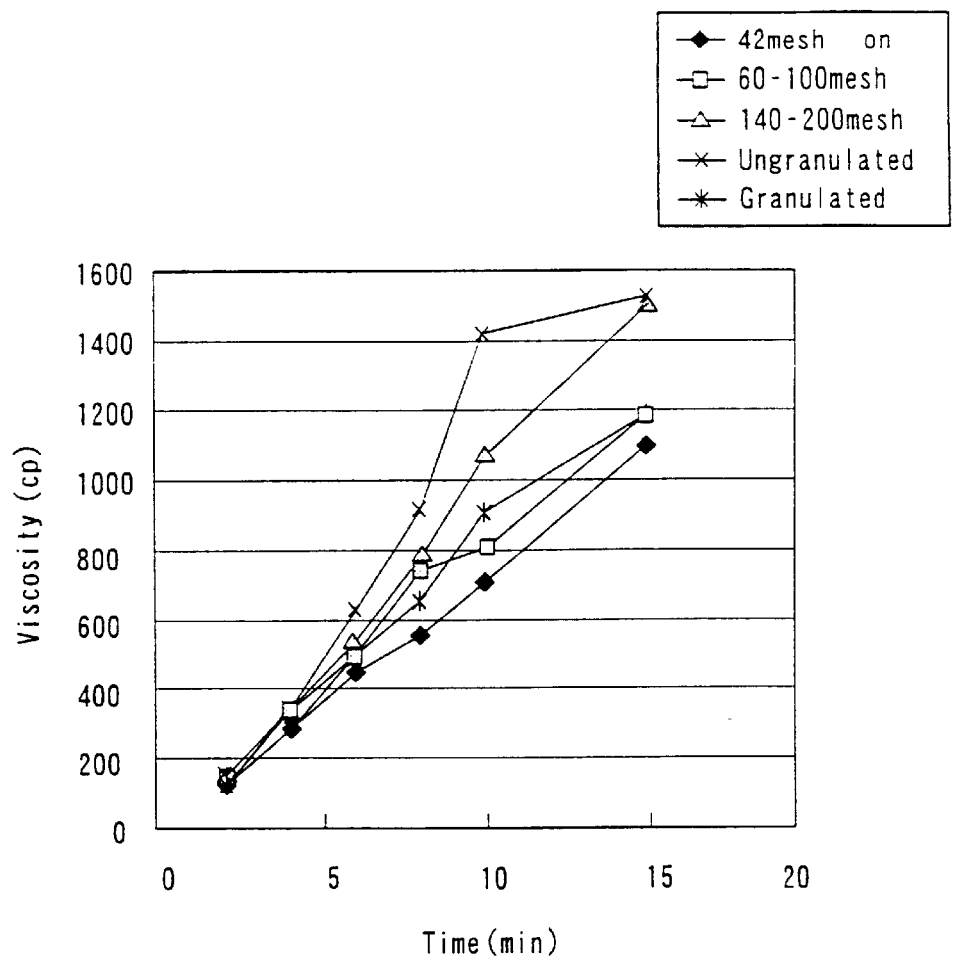
FIG. 4 illustrates a graph showing time dependent alteration of the viscosity of the aqueous solution comprising the psyllium composition containing each of the polysaccharides granulated or ungranulated, and the granulated polysaccharides including particular fractions having the specified particle size.

As indicated in Table 13 and FIG. 4, a granulated polysaccharide having a smaller (finer) particle size tends to result in a similar time-dependent alteration of viscosity as the ungranulated one, and may exert a lower viscosity-reducing effect. Meanwhile, a granulated polysaccharide having the larger (coarser) particle size may tend to exert a higher viscosity-reducing effect.

Example 13

Preparation of Powdered Juice Mix
Granulated Powder A

First, 700 g psyllium, 200 g granulated sugar, and 100 g organic acid were mixed together, then granulated using a fluidized bed granulator to prepare granulated powder A.
Granulated Powder B Essentially similar to the above procedure, 700 g dextrin (DE: 2–5), 200 g acid-treated gelatinized potato starch, 50 g gum arabic, and 50 g organic acid were mixed, then granulated using a fluidized bed granulator to prepare granulated powder B.

Next, 925 g of a 1:1 mixture of granulated powders A and B was admixed with 60 g granulated sugar, 5 g concentrated sweetener, 8 g acidulant, and 2 g flavor to prepare 1000 g of powdered juice mix comprising psyllium. Then, 10 g of the powder was packaged in an aluminum package, and the package was sealed to provide the powdered juice mix product comprising psyllium.

Figure 5:
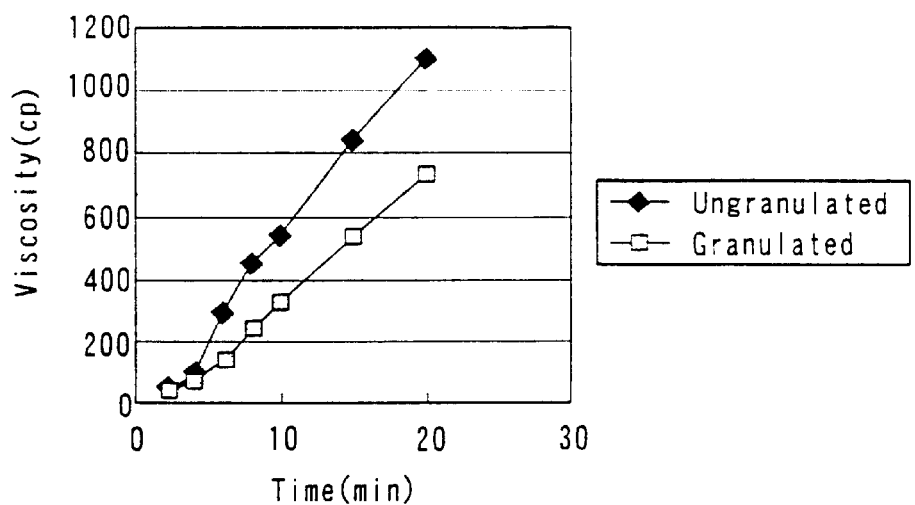
FIG. 5 illustrates a graph showing time dependent alteration of the viscosity of an aqueous solution of powdered juice mix in accordance with another embodiment of the present invention, following dissolution into water.

Ten grams of the powdered juice mix was dissolved in 180 ml of water. Subsequently, a time dependent change in viscosity of the prepared solution was determined. The results of the time dependent alteration of viscosity is shown in FIG. 5, and the particle size distribution of the granulated powder A and B is illustrated in Table 14. As a control in FIG. 5, an ungranulated sample comprising the same constituents as granulated powder B was employed.

TABLE 14

| | Powder A Granulated | | Powder B Granulated | |
|---|---|---|---|---|
| Particle Size (mesh) | Content (% (w/w)) | Cumulative Content (% (w/w)) | Content (% (w/w)) | Cumulative Content (% (w/w)) |
| <14 | 0.0 | 0.0 | 0.6 | 0.6 |
| 14–42 | 1.2 | 1.2 | 19.0 | 19.6 |
| 42–60 | 17.4 | 18.5 | 27.2 | 46.8 |
| 60–100 | 52.8 | 71.3 | 35.3 | 82.0 |
| 100–140 | 20.8 | 92.1 | 11.1 | 93.1 |
| 140–200 | 6.2 | 98.3 | 4.5 | 97.6 |
| >200 | 1.7 | 100.0 | 2.4 | 100.0 |

Example 14

Preparation of Powdered Instant Soup Mix
Granulated Powder A

First, 385 g powdered sweet corn, 365 g milk powder, 125 g granulated sugar, 62 g common salt, 31 g vegetable extract, 16 g seasonings, such as amino acids, 13 g protein hydrolysates, and 3 g flavor were mixed together, then granulated using a fluidized bed granulator to prepare granulated powder A.
Granulated Powder B Essentially similar to the above procedure, acid-treated hydroxypropyl etherified tapioca starch which was previously gelatinized was granulated using a fluidized bed granulator to prepare granulated powder B.

Next, 16 g granulated powder A, 12 g granulated powder B, and 2 g psyllium were mixed to manufacture a powdered instant soup mix product comprising psyllium for one feed.

Figure 6:
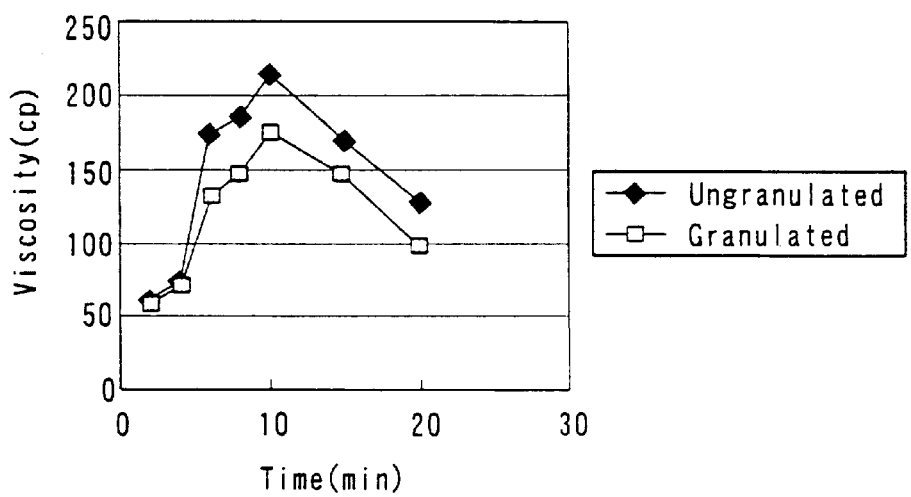
FIG. 6 illustrates a graph showing time dependent alteration of the viscosity of an aqueous solution of powdered instant soup mix in accordance with further embodiment of the present invention, following dissolution into hot water.

Thirty g of the powdered instant soup mix was dissolved in 130 ml of hot water. Subsequently, the time dependent change in viscosity of the prepared solution was determined. The results of the time dependent change in viscosity is shown in FIG. 6, and the particle size distribution of granulated powder B is illustrated in Table 15. As a control in FIG. 6, an ungranulated sample comprising the same constituents as granulated powder B was employed.

TABLE 15

| Particle Size (mesh) | Powder B Granulated | |
|---|---|---|
| | Content (% (w/w)) | Cumulative Content (% (w/w)) |
| <14 | 0.1 | 0.1 |
| 14–42 | 34.3 | 34.3 |
| 42–60 | 23.0 | 57.3 |
| 60–100 | 22.9 | 80.2 |
| 100–140 | 8.4 | 88.6 |
| 140–200 | 6.4 | 95.0 |
| >200 | 5.0 | 100.0 |

What is claimed is:

1. A method of manufacturing a liquid food comprising the steps of:

(a) preparing an aqueous solution comprising psyllium and at least one modified starch selected from the group consisting of etherified starch, esterified starch, and a mixture thereof, said modified starch having a molecular weight of 20,000 or greater, and wherein a 2% by weight aqueous solution consisting of the modified starch and water has a viscosity of 9.0 cp or less (determined using a type B viscometer with Rotor No. 1, at 60 rpm and 25° C.);

(b) packing the solution into a container, followed by sealing the container; and (c) sterilizing the solution by heating either prior to, during, or following step (b).

2. The method of claim 1 wherein, in step (a), the psyllium is added to the aqueous solution after the modified starch is dissolved.

3. The method of claim 1 wherein said modified starch is selected from the group consisting of acid-treated hydroxypropyl etherified tapioca starch, waxy cornstarch octenyl succinate, and a mixture thereof.

* * * * *